United States Patent [19]

Dauplaise et al.

[11] Patent Number: 5,041,503

[45] Date of Patent: Aug. 20, 1991

[54] MICRO-EMULSIFIED GLYOXALATED ACRYLAMIDE POLYMERS

[75] Inventors: David L. Dauplaise, Norwalk; Joseph J. Kozakiewicz, Trumbull; Joseph M. Schmitt, Ridgefield, all of Conn.

[73] Assignee: American Cyanamid Company, Stamford, Conn.

[21] Appl. No.: 536,385

[22] Filed: Jun. 11, 1990

Related U.S. Application Data

[62] Division of Ser. No. 286,091, Dec. 19, 1988.

[51] Int. Cl.$^5$ .............................................. C08F 8/12
[52] U.S. Cl. .................................... 525/383; 523/223; 524/829; 525/328.4; 525/329.4; 525/379; 525/385; 525/386; 526/306; 526/831

[58] Field of Search .................... 523/223; 524/829; 526/306, 831; 525/328.4, 329.4, 379, 383, 385, 386

[56] References Cited

U.S. PATENT DOCUMENTS 4,172,066  10/1979  Zweigle et al. .................... 523/223
4,681,912  7/1987  Durand et al. ..................... 524/829

Primary Examiner—Paul R. Michl
Assistant Examiner—Thomas McDonald
Attorney, Agent, or Firm—Frank M. Van Riet

[57] ABSTRACT

Compositions comprising microparticles of a cross-linkable, glyoxalated (meth)acrylamide containing, polymeric material are disclosed. They are prepared using inverse mircoemulsion polymerization techniques and are useful as wet- and dry-strength agents in paper production.

14 Claims, No Drawings

MICRO-EMULSIFIED GLYOXALATED ACRYLAMIDE POLYMERS

This is a divisional of co-pending application Ser. No. 07/286,091, filed on Dec. 19, 1988.

The present invention relates to microparticles of cross-linkable, glyoxalated, acrylamide polymers, their preparation and their use in making paper with improved wet and/or dry strength.

BACKGROUND OF THE INVENTION

Water-soluble polymers which have the property of imparting wet-strength to paper are important specialties of the paper-making art. Certain of these polymers, which may be anionic or cationic, develop their wet strength only under acidic conditions. See U.S. Pat. Nos. 2,345,543; 2,582,840 and 2,594,014. Detrimental results of the acidic conditions are that the papermaking equipment is subjected to corrosive conditions and that the paper undergoes premature embrittlement.

Water-soluble, glyoxalated, acrylamide polymer wet strength agents are disclosed in Coscia, U.S. Pat. No. 3,556,932, incorporated herein by reference. These wet-strength agents are made from polymers with molecular weights ranging from less than about 1,000,000, preferably less than about 25,000. The polymers are reacted with glyoxal in a dilute, aqueous solution to impart -CONHCHOHCHO functionalities onto the polymer and to increase the molecular weight of the polymer through glyoxal cross-links. Low molecular weight polymers and dilute solutions are required to impart at least a 6 percent -CONHCHOHCHO functionality to the polymers without infinitely cross-linking, or gelling, them, in which condition the polymers are useless for wet-strength applications. Even at these low solids concentrations (dilute conditions), cross-linking continues and limits the shelf life of the product. For example, commercial products, supplied as 10% solid solutions, gel within about 8 days at room temperature.

SUMMARY OF THE INVENTION

In accordance with the present invention, glyoxalated acrylamide polymer based, wet strength resins are not prepared in homogeneous aqueous solutions like the prior art above, but instead are made inside the aqueous droplets of an inverse microemulsion where there is a high solids concentration of polymer and a limited number of polymer molecules per droplet. Consequently, unlike the prior art, the polymer molecules in the present invention are isolated from each other and cannot form cross-linked gels created by reaction between large quantities of individual polymer molecules. As a result, it is not necessary for the starting polymers of this invention to possess a low molecular weight or for the glyoxal reaction to be performed under dilute conditions. Very high molecular weight polymers perform very well and the glyoxal reaction with the polymer can be performed at much higher polymer solids. Unlike the prior art, where the interpolymer glyoxal cross-linking occurs to a large extent as glyoxal reacts with acrylamide polymer, as evidenced by the viscosity increase of the product and its ultimate gellation, intrapolymer cross-linking predominates in the present invention as evidenced by a decrease in viscosity as the glyoxal reaction proceeds. The differences in the molecular weights of the polymers employed and the types of glyoxal cross-linking of the present invention in relation to the prior art, results in polymers with significantly different structures. This is further evidenced by the fact that, unlike glyoxalated acrylamide polymers of the prior art which must be essentially water-soluble, the glyoxalated acrylamide polymers of the present invention provided good wet-strength to paper even when they are cross-linked to the extent that they are merely dispersible in water. Additionally, it has surprisingly been found that the glyoxalated acrylamide polymers of the present invention also impart excellent dry strength to paper.

The formation of acrylamide polymers via microemulsion techniques is taught by Speiser, J. Pharm. Sa., 65 (12), 1763 (1976) and U.S. Pat. No. 4,021,364. These references, however, make no mention of imparting any functionality to the acrylamide polymer, let alone glyoxalation, or the unexpected improvement in the paper making processes imparted by the resultant product.

More particularly, according to the present invention, there are provided microparticles of a glyoxalated (meth)acrylamide-containing polymeric material having 1) sufficient glyoxal-reactive amide substituents and -CHOHCHO substituents to cross-link, said -CHOHCHO substituents being present in an excess of about 0.5 weight percent and 2) diameters which range from about 200 to about 3000 Å. Preferably, the -CHOHCHO substituents are present in excess of about 1.0 weight percent, and most preferably in excess of about 5.0 weight percent. Preferred particle diameters range from about 300 to about 2000 Å, and even more preferably range is from about 350 Å to about 1000 Å. The range of particle diameter size expressed above means that substantially all of the individual particles present in the compositions are between the designated suggestion ranges in diameter, not all the particles necessarily being of the same diameter. The presence of an insignificant number, i.e. preferably no more than about 5–10 weight percent, of particles having a diameter outside the range can be tolerated.

According to the present invention, there are also provided processes for the preparation of cross-linked, glyoxalated (meth)acrylamide-containing polymeric materials, as defined above, the first of said processes comprising (a) admixing
  (i) an aqueous solution of a (meth) acrylamide monomer, optionally, in the presence of a cationic comonomer;
  (ii) an oily phase comprising at least one hydrocarbon liquid; and
  (iii) an effective amount of a surfactant or surfactant mixture, so as to form an inverse microemulsion; and (b) subjecting the inverse microemulsion obtained in step (a) to polymerization conditions; the process further including the steps of (c) adding glyoxal to the polymerized microemulsion obtained in step (b); and (d) reacting the glyoxal with the acrylamide polymeric material in the aqueous droplets of the inverse microemulsion.

The second process comprises:
(a) admixing
  (i) an aqueous solution of (1) a (meth) acrylamide monomer, (2) glyoxal and, optionally, a cationic comonomer; and (ii) an oily phase comprising at least one hydrocarbon liquid; and (iii) an effective amount of a surfactant or surfactant mixture, so as to form an inverse microemulsion; and (b) subjecting the inverse microemulsion obtained in step (a) to polymerization and glyoxalation conditions.

Preferred embodiments of the above mentioned processes include the step of inverting the glyoxalated polymeric material microemulsion in water.

According to the present invention, there are also provided processes for making dry- and/or wet strength paper which comprise adsorbing an effective amount of a latent strengthening agent of the improved compositions, as defined above, on cellulose paper-making fibers in an aqueous suspension, forming the suspension into a water-laid web, and drying the web thereby developing the strengthening properties of the improved composition. Also provided by the present invention are dry- and/or wet-strength papers comprised of water-laid, cellulose, paper-making fibers bonded together by an adsorbed and at least partially cellulose-reacted content of the improved compositions as defined above.

DETAILED DESCRIPTION OF THE INVENTION

The (meth)acrylamide polymers which are glyoxalated in accordance with the present invention are prepared from such (meth)acrylamide monomers as acrylamide; per se, methacrylamide; N-alkylacrylamides such as N-methyl acrylamide; N-butylacrylamide etc.; N-alkyl methacrylamides such as N-ethylmethacrylamide and the like. The (meth)acrylamide must be present in sufficient quantities so as to provide the amide functionality as expressed above. Preferably, at least about 5.0 mole percent of the polymer should be comprised of said (meth)acrylamide monomer.

Optionally, it is preferred that the polymers also possess some degree of cationicity, sufficient to aid in rendering them self-substantive to cellulose fibers in aqueous suspensions. The proportion of cationic groupings which is preferred is small, generally less than 10 mole percent of the polymer, although a larger proportion may be employed, if desired.

Suitable cationic monomers useful in the practice of this invention comprise cationic, ethylenically unsaturated monomers of the following formulae:

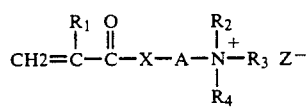
(I)

where $R_1$ is hydrogen or methyl, $R_2$ is hydrogen or lower alkyl of $C_1$ to $C_4$, $R_3$ and/or $R_4$ are hydrogen, alkyl of $C_1$ to $C_{12}$, aryl, hydroxyethyl and $R_2$ and $R_4$ or $R_2$ and $R_3$ can combine to form a cyclic ring containing one or more hetero atoms and Z is the conjugate base of acid, X is oxygen or $-NR_1$ wherein $R_1$ is as defined above, and A is an alkylene group of $C_1$ to $C_{12}$; or

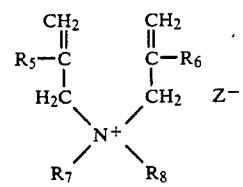
(II)

where $R_5$ and $R_6$ are hydrogen or methyl, $R_7$ is hydrogen, alkyl of $C_1$ to $C_{12}$ or benzyl and $R_8$ is hydrogen, alkyl of $C_1$ to $C_{12}$ benzyl or hydroxyethyl; and Z is as defined above.

Preferred cationic monomers include diallyl dialkylammonium chlorides; 1-methacryloyl-4-methyl piperazine; N,N-dialkylaminoalkyl(meth)acrylates; N,N-dialkylaminoalkyl(meth)acrylamides, salts, quaternaries and mixtures thereof.

In addition, up to about 85 mole percent of the (meth)acrylamide containing polymer may be composed of a water-soluble, non-ionic, ethylenically unsaturated comonomer copolymerizable therewith such as N-vinyl pyrrolidone; N,N-dialkyl(meth)acrylamides including N,N-dimethyl acrylamide; hydroxyalkyl(meth)acrylates; N-vinyl formamide and the like.

Furthermore, the (meth)acrylamide containing polymers useful herein may contain small amounts, i.e. up to about 10 mole percent, of other copolymerizable monomers such as methyl acrylate; methyl methacrylate; acrylonitrile; vinyl acetate; styrene and the like.

Cross-linkable, as used herein and in the appended claims, is defined as a glyoxalated, (meth)acrylamide containing, polymeric material possessing unreacted glyoxal substituents capable of reacting with unreacted amide groups on the polymer backbone. Thus, while the glyoxalated, (meth)acrylamide containing polymeric material is generally cross-linked to a degree, further cross-linking of the -CHOHCHO substituent and the glyoxal-reactive amide substituents of the acrylamide is still possible.

The glyoxalated (meth)acrylamide polymers of the present invention can be prepared in several ways. One approach is to prepare an inverse microemulsion containing a (meth)acrylamide and, optionally, a cationic and/or other monomer(s), and to subject it to cationic and/or other monomer(s), and to subject it to polymerization conditions. After the polymerization is complete, glyoxal is added to the polymerization media and reacted with the polymer in the aqueous polymer containing droplets. The rate of the reaction of the glyoxal with the polymer can be controlled with temperature and pH. Temperatures ranging from about 10° C. to about 90° C. and a pH of about 2 to about 7, may be used. The rate of reaction increases with increasing temperature and pH.

A second approach is to prepare an inverse microemulsion containing (meth)acrylamide/glyoxal, and, optionally, a cationic or other monomer, and to subject it to polymerization and glyoxalation conditions. The glyoxal present in the aqueous droplets reacts with the (meth)acrylamide monomer or the resultant polymer or both to produce the glyoxalated polymer, as discussed above. Both of these approaches lead to inverse microemulsions possessing aqueous droplets containing glyoxalated (meth)acrylamide polymers. These emulsions may then be inverted into water, optionally in the presence of breaker surfactant, prior to use.

Polymerization in microemulsion and inverse microemulsions is known to those skilled in this art. P. Speiser reported in 1976 and 1977 a process for making spherical "nanoparticles" with diameters less than 800 Å by (1) solubilizing monomers such as acrylamide and methylenebisacrylamide and other materials, such as drugs, in micelles and (2) polymerizing the monomers; see, J. Pharm. Sa., 65 (12), 1763 (1976) and U.S. Pat. No. 4,021,364. Both water-in-oil and oil-in-water systems can be used to prepare these nanoparticles. While not specifically called microemulsion polymerization by the author, this process does contain all the features which are currently used to define microemulsion polymerization. These reports also constitute the first examples of polymerization of acrylamide in a microemulsion. Since then, numerous publications reporting polymerization of water-soluble polymers in the inverse phase of microemulsions have appeared. See, for example, U.S. Pat. Nos. 4,521,317; 4,681,912 and GB 2161492A, incorporated herein by reference.

In general, microemulsion polymerization processes are conducted by (i) preparing a monomer microemulsion by adding an aqueous solution of the monomers to a hydrocarbon liquid containing appropriate surfactant or surfactant mixture to form an inverse monomer microemulsion consisting of small aqueous monomer droplets dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

Suitable monomers are as defined above. The aqueous monomer solution may contain such conventional additives as are desired. For example, the solution may contain chelating agents to remove polymerization inhibitors; chain-transfer agents; pH adjusters; initiators and other conventional additives.

Essential to the formation of the microemulsion, which may be defined as a transparent and thermodynamically stable emulsion comprising two liquids insoluble in each other and a surfactant, in which the micelles are usually of 1000 Å or less in diameter, is the selection of appropriate organic phase and surfactant.

The selection of the organic phase has a substantial effect on the minimum surfactant concentration necessary to obtain the inverse microemulsion. This organic phase may consist of a hydrocarbon or hydrocarbon mixture. Isoparaffinic hydrocarbons or mixtures thereof are the most desirable in order to obtain inexpensive formulations. Typically the organic phase will comprise mineral oil, toluene, fuel oil, kerosene, odorless mineral spirits, mixtures of any of the foregoing and the like.

The ratio, by weight, of the amounts of aqueous phase and hydrocarbon phase is chosen as high as possible, so as to obtain, after polymerization, a microemulsion of high polymer content. Practically, this ratio may range, for example, from about 0.5 to about 3:1, and usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., sufficient to form an the formation of inverse microemulsion. Too low a concentration of surfactant leads to the formation of inverse emulsions and too high a concentration results in increased costs and does not impart any significant benefit. Typical surfactants useful in the practice of this invention may be anionic, cationic or nonionic. Preferred surfactants include sorbitan monooleate; polyoxyethylene (20) sorbitan monooleate; sodium dioctylsulfosuccinate; oleamidopropyldimethylamine; sodium isostearyl-2-lactate and the like.

Polymerization of the microemulsion may be carried out in any manner known to those skilled in the art. Initiation may be effected with a variety of thermal and redox free-radical initiators including peroxides such as t-butyl peroxide; azo compounds such as azobisisobutyronitrile; inorganic compounds such as, potassium persulfate and redox couples such as ferric ammonium sulfate/ammonium persulfate. Polymerization may also be effected by photochemical irradiation processes such as ultraviolet irradiation or by ionizing radiation with a cobalt 60 source.

Although the above discussion is directed primarily to the use of (meth)acrylamide-based polymers which, in the absence of glyoxal, are substantially linear, it is also possible to use lightly to moderately cross-linked (meth)acrylamide-based polymers which can be prepared by adding small amounts of cross-linking monomers such as methylenebisacrylamide etc. to the aqueous acrylamide monomer solutions of either of the processes described above prior to polymerization.

The polymers of the present invention are conveniently employed in the manufacture of paper as dilute aqueous solutions. These solutions can be formed by inverting the microemulsion into water or by recovering the polymer from the microemulsion such as by stripping or by adding the microemulsion to a solvent which precipitates the polymer e.g. isopropanol or acetone, filtering off the resultant solids, drying and redispersing in water. The aqueous solutions can be applied to preformed paper by the "tub" or impregnation method, but more conveniently are applied by adding the solutions directly to papermaking fibrous suspensions at any point in the paper-making process where wet-strength resins are ordinarily added.

The preferred cationic polymers of the present invention are rapidly and substantively adsorbed by the paper-making fibers at pH values ranging from about 3.5 to about 8 and the use of retention aids is usually unnecessary. While best wet strength results are achieved at low pH, very satisfactory wet-strength is achieved with neutral pulps.

A substantial amount of wet-strength is imparted when as little as 0.1 weight percent, based on dry fiber weight of the microparticles of the present invention, is used. The strengthening effect further increases with increasing microparticle usage of up to at least 2.0 weight percent or more.

As mentioned above, wet-strength is known to be imparted to paper when compositions containing glyoxalated (meth)acrylamide polymer are added thereto. These polymers are also known to concurrently impart dry strength to said paper. The ratio of wet strength to dry strength obtained utilizing the conventional compositions of the prior art has been found to be relatively constant regardless of the steps taken to increase this ratio.

Surprisingly, it has been found that the wet to dry ratio of treated paper can be increased without significantly altering the wet strength thereof with certain compositions of the present invention. Thus, compositions which contain from about 50 to about 85 weight percent of a non-ionic ethylenically, unsaturated comonomer such as N,N-dimethylacrylamide a N-vinylpyrrolidone impart substantially the same wet strength, but reduced dry strength, to paper compared to compositions which do not contain the non-ionic comonomer in conjunction with the (meth)acrylamide.

DESCRIPTION OF THE PREFERRED EMBODIMENTS

The following examples illustrate the present invention. They are not to be construed to limit the claims in any manner whatsoever.

Bulk Viscosity (BV) of emulsions is measured at $25° \pm °$ C. in a Brookfield viscometer (LVT model) with a #2 spindle at 12 rpm.

Standard Viscosity (SV) is measured by adding 50 g of a 0.2% aqueous polymer solution to 48 gms of water, stirring the resulting mixture for 5 minutes to completely dissolve the salt, adjusting the pH to 5 and determining the viscosity at $25° \pm 0.1°$ C. using a Brookfield viscometer (LVT model) with UL adapter at 60 rpm.

EXAMPLE 1

To a suitable reactor are added 96 gms of an isoparaffinic solvent having a b.p. of 207°–254° C. (IPS), 10.61 gms of polyoxyethylene sorbitan trioleate (POST) and 6.37 gms of the reaction product of diethanolamine and oleic acid (DOA). To the clear solution is added a solution of 28.61 gms of acrylamide (AMD), 5.05 gms of diallyldimethyl ammonium chloride (DADM), 0.017 gm of the disodium salt of ethylenediaminetetracetic acid (EDTA) 0.0034 gm of $NaBrO_3$ and 46.32 gms of deionized water with stirring to produce a clear microemulsion. The solution pH is adjusted to 4.0 with sulfuric acid and the microemulsion is nitrogen sparged to reduce its oxygen content to less than 0.1 ppm. $SO_2$ gas is then passed into the microemulsion to initiate polymerization. The emulsion temperature is held at 25° C. during the polymerization until 96% of the AMD and about 40% of the DADM is converted to polymer. The resultant clear product has a bulk viscosity of 15 cps, a particle size of about 420 Å and a Standard Viscosity of 2.9 cps ($3 \times 10^6$ M.W.) and a solids content of 17.49%. To 50 gms of the above microemulsion are added 5.45 gms of a 40% aqueous glyoxal solution at pH 4.0. After standing at room temperature for 17 and 31 days, respectively, 2 portions of the emulsion are inverted by adding them to deionized water and the resultant solutions are added to paper pulp at 0.5% and 1.0%, based on the dry fiber. See Table 1 for the paper test results. The acronyms given the various materials in Example 1 apply equally to all the following examples as well as others expressed therein.

TABLE 1

| PAPER TEST | | |
|---|---|---|
| | Example | |
| Tensile Strength-lbs/in. | 1* | 1 |
| 0.5%, weight | | |
| 17 days, | 3.1 | 3.5 |
| 31 days, | 2.9 | 3.3 |
| 1.0%, weight | | |
| 17 days, | 4.0 | 4.6 |

TABLE 1-continued

| PAPER TEST | | |
|---|---|---|
| | Example | |
| Tensile Strength-lbs/in. | 1* | 1 |
| 31 days, | 4.1 | 4.7 |

*control sample; solids content 10%; AMD/DADM/glyoxal commercial product; backbone polymer molecular weight = 10,000.

As can be seen by the wet-strength data, AMD/DADM/glyoxal microemulsion products of the present invention provide greater wet strength than AMD/DADM/glyoxal wet strength agents described in the prior art as represented by a commerically available sample. The AMD/DADM/glyoxal products of the present invention are also shown to be capable of preparation at higher solids and at higher molecular weight than the commercial product.

EXAMPLES 2-6

Examples 2-6 describe a series of microemulsion compositions prepared from monomer microemulsions containing AMD/DADM (90/10 by weight), but with varying amounts of glyoxal.

EXAMPLE 2

28.74 gms of POST, 6.74 gms of sorbitan monosoleate (SM) and 0.071 gm of benzoin isobutyl ether are dissolved in 191.93 gms of IPS to produce an oil solution. Separately, an aqueous solution of 51.34 gms of AMD, 5.68 gms of DADM, 14.20 gms of glyoxal, 0.028 gm of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen and polymerization of the monomers thereof is initiated with UV light at 25° C. The polymerization is continued for approximately one half hour and produces a clear, stable microemulsion containing a glyoxalated copolymer of AMD/DADM. The microemulsion possesses a bulk viscosity of 16 cps.

EXAMPLE 3

28.74 gms of POST, 6.74 gms of SM and 0.071 gm of benzoin isobutyl ether are dissolved in 191.93 gms of IPS to product an oil solution. Separately, an aqueous solution of 42.58 gms of AMD, 4.74 gms of DADM, 23.66 gms of glyoxal, 0.028 gm of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen and polymerization is initiated as in Example 2. The microemulstion of glyoxalated copolymer of AMD/DADM possesses a bulk viscosity of 15 cps.

EXAMPLE 4

31.51 gms of POST, 3.97 gms of SM and 0.071 gm of benzoin isobutyl ether are dissolved in 191.93 gms of IPS to produce an oil solution. Separately, an aqueous solution of 36.5 gms of AMD, 4.06 gms of DADM, 30.42 gms of glyoxal, 0.028 gms of EDTA and 89.27 gms of water is prepared and adjusted to pH 3.5 with 0.5N HCl. The aqueous monomer solution is then added to the oil solution producing a clear microemulsion as in Example 1. Polymerization is conducted as in Example 2 to produce a clear, stable microemulsion containing a glyoxalated copolymer of AMD/DADM having a bulk viscosity of 20.0 cps.

EXAMPLE 5

31.51 gms of POST, 3.97 gms of SM and 0.071 gm of benzoin isobutyl ether are dissolved in 191.93 gms of IPS to produce an oil solution. Separately, an aqueous solution of 31.94 gms of AMD, 3.54 gms of DADM, 35.48 gms of glyoxal, 0.028 gms of EDTA and 89.27 gms of water is prepared and adjusted to pH 3.5 with 0.5N HCl. The aqueous monomer solution is then added to the oil solution producing a clear microemulsion as in Example 1 The resulting microemulsion is sparged with nitrogen. Polymerization is conducted as in Example 2 to produce a clear, stable microemulsion containing a glyoxalated copolymer of AMD/DADM having a bulk viscosity of 5.0 cps.

EXAMPLE 6

31.51 gms of POST, 3.97 gms of SM and 0.071 gm of benzoin isobutyl ether are dissolved in 191.93 gms of IPS to produce an oil solution. Separately, an aqueous solution of 28.4 gms of acrylamide, 3.16 gms of DADM, 39.44 gms of glyoxal, 0.028 gms of EDTA and 89.87 gms of water is prepared and adjusted to pH 3.5 with 0.5N HCl. The aqueous monomer solution is then added to the oil solution producing a clear microemulsion as in Example 1. The resulting microemulsion is sparged with nitrogen and then polymerization is conducted as in Example 2 to produce a clear, stable microemulsion containing a glyoxalated copolymer of AMD/DADM having a bulk viscosity of 17.5 cps.

EXAMPLES 7-9

Examples 7-9 describe a series of compositions prepared from monomer microemulsions possessing varying ratios of AMD/DADM while maintaining a 25%, by weight, glyoxal concentration.

EXAMPLE 7

14.56 gms of POST, 3.18 gms of SM and 0.0354 gm of benzoin isobutyl ether are dissolved in 95.95 gms of IPS to produce an oil solution. Separately, an aqueous solution of 22.71 gms of AMD, 5.68 gms of DADM, 7.10 gms of glyoxal, 0.014 gm of EDTA and 44.64 gms of water is prepared and adjusted to pH 3.5 with 0.5N HCl. The aqueous monomer producing solution is then added to the oil solution producing a clear microemulsion as in Example 1. The resulting microemulsion is sparged with nitrogen and polymerization is conducted as in Example 2 to produce a clear, stable microemulsion containing a glyoxalated copolymer of AMD-/DADM.

EXAMPLE 8

15.36 gms of POST, 2.38 gms of SM and 0.0354 gm of benzoin isobutyl ether are dissolved in 95.95 gms of IPS to produce an oil solution. Separately, an aqueous solution of 19.87 gms of AMD, 8.52 gms of DADM, 7.10 gms of glyoxal, 0.014 gm of EDTA and 44.64 gms of water is prepared and adjusted to pH 3.5 with 0.5N HCl. The aqueous monomer solution is then added to the oil solution producing a clear microemulsion as in Example 1. Polymerization is effected as in Example 2 to produce a clear, stable microemulsion containing a glyoxalated copolymer of AMD/DADM.

EXAMPLE 9

16.94 gms of POST, 0.97 gms of SM and 0.0354 gms of benzoin isobutyl ether are dissolved in 95.95 gms of IPS to produce an oil solution. Separately, an aqueous solution of 14.2 gms of AMD, 14.2 gms of DADM, 7.10 gms of glyoxal, 0.014 gms of EDTA and 44.64 gms of water is prepared and adjusted to pH 3.5 with 0.5N HCl. The aqueous monomer solution is then added to the oil solution producing a clear microemulsion as in Example 1. Polymerization is effected as in Example 2 to produce a clear, stable microemulsion containing a glyoxalated copolymer of AMD/DADM.

EXAMPLE 10

Example 10 is an example of a process utilizing redox initiation and post-addition of glyoxal to the polymerized AMD/DADM microemulsion.

12.85 gms of POST and 3.57 gms of SM are dissolved in 96.0 gms of IPS to produce an oil solution. Separately, an aqueous solution of 28.61 gms of AMD, 5.05 g of DADM, 0.017 g of EDTA 0.12 gm of a 2.83 percent solution of sodium bromate and 44.66 gms of water is prepared and adjusted to pH 4.0 with 1.0N sulfuric acid. The aqueous monomer solution is then added to the oil solution producing a clear microemulsion as in Example 1. The resulting microemulsion is sparged with nitrogen and $SO_2$ gas is bubbled into the microemulsion initiating polymerization at 25° C. The $SO_2$ bubbling is continued until the polymerization is complete producing a clear, stable microemulsion containing a copolymer of AMD/DADM. To 50 gms of this emulsion are added 5.45 gms of a 40% aqueous glyoxal solution at pH 4. The resulting clear microemulsion contains a glyoxalated copolymer of AMD/DADM.

EXAMPLES 11-14

Examples 11-14 are systems in which a portion of the acrylamide is replaced with another nonionic monomer (N,N-dimethylacrylamide (DMA) or N-vinyl-2-pyrrolidone (VP)).

EXAMPLE 11

12.44 gms of POST, 5.30 gms of SM and 0.0354 gm of benzoin isobutyl ether are dissolved in 95.96 gms of IPS to produce an oil solution. Separately, an aqueous solution of 12.78 gms of AMD 12.78 gms of VP, 2.84 gms of DADM, 7.10 gms of glyoxal, 0.014 gm of EDTA, 1.42 gms of sodium acetate buffer and 43.07 gms of water is prepared at pH 5.5. The aqueous monomer solution is then added to the oil solution producing a clear microemulsion as in Example 1. The resulting microemulsion is polymerized as in Example 2 to produce a clear, stable microemulsion containing a glyoxalated terpolymer of AMD/VP/DADM.

EXAMPLE 12

7.15 gms of POST, 10.59 gms of SM and 0.0354 gm of benzoin isobutyl ether are dissolved in 95.96 gms of IPS to produce an oil solution. Separately, an aqueous solution of 5.68 gms of AMD, 19.88 gms of VP, 2.84 gms of DADM, 7.10 gms of glyoxal, 0.014 gm of EDTA, 1.42 gms of sodium acetate buffer and 43.07 gms of water is prepared at pH 5.5. The aqueous monomer solution is then added to the oil solution producing a clear microemulsion as in Example 1. Polymerization clear microemulsion as in Example 1. Polymerization as in Example 2 produces a clear, stable microemulsion containing a glyoxalated terpolymer of AMD/VP/DADM.

EXAMPLE 13

2.96 gms of polyoxyethylene sorbitan monooleate (POSO), 14.78 gms of polyoxyethylenesorbitol hexaoleate (PESH) and 0.0354 gm of benzoin isobutyl ether are dissolved in 95.96 gms of IPS to produce an oil solution. Separately, an aqueous solution of 2.56 gms of AMD, 23.09 gm of DMA, 2.84 gms of DADM, 7.10 gms of glyoxal, 0.014 gms of EDTA, 1.42 gms of sodium acetate buffer and 43.07 gms of water is prepared at pH 5.5. The aqueous monomer solution is then added to the oil solution producing a clear microemulsion as in Example 1. Polymerization, as in Example 2 produces a clear, stable microemulsion containing a glyoxalated terpolymer of AMD/DMA/DADM.

EXAMPLE 14

17.14 gms of PESH, 0.60 gm of SM and 0.0354 gm of benzoin isobutyl ether are dissolved in 95.96 gms of IPS to produce an oil solution. Separately, an aqueous solution of 12.78 gms of AMD, 12.78 gms of DMA, 2.84 gms of DADM, 7.10 gms of glyoxal, 0.014 gm of EDTA, 1.42 gms of sodium acetate buffer and 43.07 gms of water is prepared at pH 5.5. Following Example 2, polymerization results in a clear, stable microemulsion containing a glyoxalated terpolymer of AMD/DMA/DADM.

EXAMPLES 15-22

Examples 15-22 describe the preparation of a series of microemulsion and standard inverse emulsions with varying particle sizes to determine the effect of particle size on wet strength performance. All products are produced from (90/10) AMD/DADM starting monomer (micro)emulsions which are charged with 25%, by weight, of glyoxal based on AMD/DADM.

EXAMPLE 15

8.63 gms of POST, 2.02 gms of SM and 0.0354 gm of benzoin isobutyl ether are dissolved in 95.96 gms of IPS to produce an oil solution. Separately, an aqueous solution of 25.55 gms of AMD, 2.84 gms of DADM, 7.10 gms of glyoxal, 0.014 gms of EDTA, 1.42 gms of sodium acetate buffer and 43.08 gms of water is prepared at pH 5.5. The aqueous monomer solution is then added to the oil solution producing a clear microemulsion as in Example 1. Polymerization as in Example 2 produces a clear, stable microemulsion containing a glyoxalated copolymer of AMD/DADM. The particle size of the polymer particles is about 630 Å.

EXAMPLE 16

The procedure of Example 15 is again followed except that 28.75 gms of POST and 6.74 gms of SM are used. A glyoxalated copolymer of AMD/DADM with a particle size of about 310 Å is produced.

EXAMPLE 17

Following the procedure of Example 15, except that 11.5 gms of POST and 2.7 gms of SM are used, a glyoxalated copolymer of AMD/DADM having a particle size of about 520 Å.

EXAMPLE 18

Again following the procedure of Example 15 except that 14.37 gms of POST and 3.37 gms of SM are used, a glyoxalated copolymer of AMD/DADM is produced. The particle size of the polymer particles is about 360 Å.

EXAMPLE 19

(Comparative)

7.5 gms of DOA and 1.25 gms of an A/B/A block copolymer of about 5000 m.w. wherein the A units comprise palmitic acid and 12-hydroxystearic acid (1:5) and the B units are polyethylene oxide (m.w. 1500) (hereinafter identified as PHP) are dissolved in 70.71 gms of a mixed hydrocarbon solvent having a b.p. range of 370°-518° F. (MH). Separately, an aqueous solution of 59.20 gms of AMD, 6.58 gms of DADM, 16.45 gms of glyoxal, 0.039 gm of EDTA, 3.29 gms of sodium acetate buffer, 0.27 gm of sodium sulfate, 0.0822 gm of 2,2'-azobis(2-amidinopropane)-dihydrochloride (ABDC) and 99.42 gms of water is prepared and adjusted to pH 5.5 with 0.5N HCl. The aqueous monomer solution is then added to the oil solution and emulsified. The resulting white, inverse emulsion is sparged with nitrogen and then initiated at 25° C. with U.V. light. The polymerization is continued for approximately one hour and produces an inverse emulsion containing a glyoxalated copolymer of AMD/DADM possessing a bulk viscosity of 670 cps. The particle size of the polymer is about 3260 Å.

EXAMPLE 20

(Comparative)

3.97 gms of DOA, 0.79 gm of PHP and 0.0822 gm of benzoin isobutyl ether are dissolved in 74.70 gms of MH. Following Example 19 except that the ABDC is omitted, an aqueous solution is prepared and adjusted to pH 5.5 with 0.5N HCl. The aqueous monomer solution is then added to the oil solution and emulsified. The resulting white, inverse emulsion is sparged with nitrogen and then initiated with UV light at 25° C. The polymerization is continued for approximately one hour and produces an inverse emulsion containing a glyoxalated copolymer of AMD/DADM possessing a bulk viscosity of 193 cps. The particle size of the emulsion is about 7820 Å.

EXAMPLE 21

The procedure of Example 19 is again followed except that benzoin isobutyl ether is used in place of the ABDC in equivalent amounts. The resultant polymer has a particle size of 2090 Å.

EXAMPLE 22

15.49 gms of POST and 2.29 gms of SM are dissolved in 95.96 gms of IPS and 0.0354 gm of benzoin isobutyl ether to produce an oil solution. Separately, an aqueous solution of 18.40 gms of AMD, 2.05 gms of DADM, 5.11 gms of glyoxal, 0.012 gm of EDTA, 1.02 gms of sodium acetate and 53.41 gms of water is prepared and adjusted to pH 5.5. The aqueous monomer solution is added to the oil solution producing a clear microemulsion. The resulting emulsion is sparged with nitrogen and initiated with UV light at 25° C. The polymerization is continued for about one half hour and produces a clear, stable microemulsion with a bulk viscosity if 30 cps. The particle size if the glyoxalated AMD/DADM copolymer is 550 Å.

EXAMPLE 23

(Comparative)

52.59 gms of POST and 31.56 gms of DOA are dissolved in 96 gms of IPS to produce an oil solution. Separately, an aqueous solution of 28.61 gms of AMD, 5.05 gms of DADM, 0.017 gm of EDTA, 0.0034 gm of ABDC and 46.32 gms of water is prepared. The aqueous monomer solution is added to the oil solution producing a clear microemulsion. The microemulsion is sparged with nitrogen and then initiated with UV light at 25° C. The polymerization is continued for about 2 hours and produces a clear, stable microemulsion containing a copolymer of AMD/DADM. The bulk viscosity is 213 cps and the polymer particle size is 220 Å.

EXAMPLE 24

71.78 gms of POST, and 16.86 gms of SM and 0.0354 gms of benzoin isobutyl ether are dissolved in 95.96 gms of MH resulting in an oil solution. Separately, an aqueous solution of 25.55 gms of AMD, 2.84 gms of DADM, 7.10 gms of glyoxal, 0.014 gm of EDTA 1.42 gms of sodium acetate, and 43.08 gms of water is prepared and adjusted to pH 5.5 with 0.5N HCl. The aqueous monomer solution is then added to the oil solution producing a clear microemulsion. The microemulsion is then treated as in Example 15 resulting in a glyoxalated copolymer of AMD/DADM possessing a bulk viscosity of 105 cps. The particle size of the polymer is about 300 Å.

EXAMPLES 25–44

In order to determine the ability of the compositions of this invention to impart wet strength to paper, the products prepared in Examples 2-6 (Table 2) (various levels of glyoxal), Examples 7 and 10 (Table 3) (increased levels of DADM), (redox initiation and post addition of glyoxal), Examples 11 and 13 (Table 4) (AMD/VP/DADM and AMD/DMA/DADM terpolymers), and Examples 15-24 and 1 (effect of particle size on performance) (Table 5) were used to make wet strength paper and the resulting properties of the paper examined.

The following describes the method used for making the wet-strength paper. To an aqueous pulp at 0.6% consistency and pH 6.5 composed of bleached Astracell/Albacell hardwood/softwood 50/50, by weight, kraft paper-making fibers beaten to a Canadian standard freeness of about 500 ml is added the cationic resin solution of one of the examples, as a 0.1% solution of broken emulsion, to provide 0.5% of the glyoxalated polymer based on the dry weight of the fibers. The pulp is readjusted to pH 6.5 and is stirred briefly to permit the polymer to be absorbed by the fibers. The fibers are formed into a water-laid web having a basis weight of 50 lbs (25"×40"/500 ream) in a Nash handsheet machine. The web is pressed between blotters and dried for 1 minute on a rotary laboratory drum drier having a drum temperature of 240° F.

The immediate wet strength of the resulting paper is measured after brushing both sides of the paper with water at 20° C. and pH 7. The wet strength results are shown in the Tables 2–5 as the performance of the various polymers of the examples specified as a percent of performance of a commercially available 25% glyoxalated polymer of AMD and DADM (90/10).

TABLE 2

| Example | Polymer of Example | Percentage of Commercial Product Immediate Wet Strength Performance | % Glyoxal[a] | AMD/DADM |
|---|---|---|---|---|
| 25 | 2 | 118 | 25 | 90/10 |
| 26 | 3 | 120 | 50 | " |
| 27 | 4 | 124 | 75 | " |
| 28 | 5 | 126 | 100 | " |
| 29 | 6 | 124 | 125 | " |

[a] percent based on AMD/DADM monomer charge

TABLE 3

| Example | Polymer of Example | Percentage of Commercial Product Immediate Wet Strength Performance | % Glyoxal[a] | AMD/DADM |
|---|---|---|---|---|
| 30 | 7 | 106 | 25 | 80/20 |
| 31 | 10 | 106 | 25 | 85/15 |

TABLE 4

| Example | Polymer of Example | Percentage of Commercial Product Immediate Wet Strength Performance | Paper Strength/Ratio Wet/Dry (%) | % Glyoxal[a] | |
|---|---|---|---|---|---|
| | | | | | AMD/DAM/DADM |
| 32 | 13 | 103 | 19.1[b] | 25 | 9/81/10 |
| | | | | | AMD/VP/DADM |
| 33 | 11 | 111 | 20.1[c] | 25 | 45/45/10 |

[b] = commercial product is 14.3
[c] = commercial product is 14.5

TABLE 5

| Example | Polymer of Example | Percentage of Commercial Product Immediate Wet Strength Performance | Particle size (Å)[d] | Reaction Charge In Aq. Phase % | AMD/DADM/Glyoxal |
|---|---|---|---|---|---|
| 34 | 15 | 123 | 630 | 44.4 | 90/10/25 |
| 35 | 16 | 118 | 310 | " | " |
| 36 | 17 | 123 | 520 | " | " |
| 37 | 18 | 120 | 360 | " | " |
| 38[c] | 19 | 81 | 3260 | " | " |
| 39[c] | 20 | 67 | 7820 | " | " |
| 40 | 21 | 109 | 2090 | " | " |
| 41 | 22 | 132 | 550 | 32.0 | " |

TABLE 5-continued

| Example | Polymer of Example | Percentage of Commercial Product Immediate Wet Strength Performance | Particle size (Å)$^d$ | Reaction Charge In Aq. Phase % | AMD/DADM/ Glyoxal |
|---|---|---|---|---|---|
| 42$^c$ | 23 | 0 | 220 | 42.1 | 85/15/0 |
| 43 | 24 | 88 | 300 | 44.4 | 90/10/25 |
| 44 | 1 | 113 | 420 | 42.1 | 85/15/25 |

$^c$ = Comparative
$^d$ = Transmission Electron Microscopy

The results in Table 2 show that a variety of glyoxal levels can be employed while achieving improved performance of the instant polymers relative to the prior art. Table 3 shows that the benefits of the instant invention are achieved at a variety of AMD/DADM compositions (80/20, by weight, in Example 7, 85/15, by weight, in Example 31 and 90/10, by weight, in Example 25, Table 2). Table 4 shows the invention utilizing terpolymers containing a second nonionic monomer (N,N-dimethylacrylamide and vinyl pyrrolidone) in addition to acrylamide. As can be readily appreciated, these results show that immediate wet strength improvement is maintained while the dry strength is reduced by the increase in the wet/dry ratio. Table 5 shows the effect of particle size on the optimum performance of the product. The compositions of Examples 34–37, 40, 41 and 44 clearly show the improved results in that these compositions show an increase of 9–32% in wet strength performance over the commercially available compositions of the same basic components and concentrations.

EXAMPLE 45

The procedure of Example 1 is followed except that no DADM is added to the monomer mixture. A composition comprising microparticles of a cross-linked glyoxalated acrylamide homopolymer is formed with results similar to Example 1 being achieved.

EXAMPLES 46–48

The procedure of Example 1 is repeated except that 46) methacryamide, 47) N-methyl acrylamide and 48) N-methyl methacrylamide are substituted for the acrylamide monomer. Compositions comprising microparticles of glyoxalated cationic acrylamide copolymers are formed similar to those of Example 1.

EXAMPLE 49–51

The procedure of Example 1 is followed except that 50) methacryloxyethyltrimethylammonium chloride, 51) methacrylamidopropyltrimethylammonium chloride, and 52) acryloxyethyltrimethyl ammonium chloride are used to replace the DADM. Similar results are achieved.

We claim:

1. A process for the preparation of microparticles of a cross-linked, glyoxalated, (meth)acrylamide-containing polymeric material having 1) sufficient glyoxal-reactive amide substituents and —CHOHCHO substituents to continually self cross-link said material at ambient conditions, said —CHOHCHO substituents being present in an excess of about 0.5 weight percent and 2) diameters ranging from about 200 to 3000 Å, which comprises
   (a) admixing
      (i) an aqueous solution of a (meth)acrylamide monomer and, optionally, a cationic comonomer;
      (ii) an oily phase comprising at least one hydrocarbon liquid; and
      (iii) an effective amount of a surfactant or surfactant mixture, so as to form an inverse microemulsion; and
   (b) subjecting the inverse microemulsion obtained in step (a) to polymerization conditions,
   (c) adding glyoxal to the polymerized microemulsion obtained in step (b); and
   (d) reacting the glyoxal with the acrylamide polymeric material in the aqueous droplets of the inverse microemulsion.

2. A process for the preparation of microparticles of a cross-linked, glyoxalated (meth)acrylamide-containing polymeric material having 1) sufficient glyoxal-reactive amide substituents and —CHOHCHO substituents to continually self cross-link said material at ambient conditions, said —CHOHCHO substituents being present in an excess of about 0.5 weight percent and 2) diameters ranging from about 200 to about 3000 Å, which comprises
   (a) admixing
      (i) an aqueous solution of (3) an acrylamide monomer (4) glyoxal and, optionally, a cationic comonomer; and
      (ii) an oily phase comprising at least one hydrocarbon liquid; and
      (iii) an effective amount of a surfactant or surfactant mixture, so as to form an inverse microemulsion; and
   (b) subjecting the inverse microemulsion obtained in step (a) to polymerization and glyoxalation conditions.

3. A process as defined in claim 1 including the step of (e) inverting the glyoxalated polymeric material microemulsion.

4. A process as defined in claim 2 including the step of (c) inverting the glyoxalated polymeric material microemulsion.

5. A process defined in claim 1 wherein said cationic comonomer of step (a)(i) comprises a diallyl dialkylammonium chloride, an N,N-dialkylaminoalkyl(meth)acrylate, an N,N-dialkylaminoalkyl(meth)acrylamide, and salts, quaternaries or and mixtures thereof.

6. A process as defined in claim 1 wherein said (meth)acrylamide monomer comprises acrylamide; methacrylamide; an N-alkyl acrylamide; an N-alkyl methacrylamide or mixtures thereof.

7. A process as defined in claim 1 wherein said (meth)acrylamide polymer comprises a copolymer of acrylamide and a diallyldialkylammonium chloride.

8. A process defined in claim 2 wherein said cationic comonomer of step (a)(i) comprises a diallyl dialkylammonium chloride, an N,N-dialkylaminoalkyl(meth)acrylate; an N,N-dialkylaminoalkyl(meth)acrylamide, and salts, quaternaries and mixtures thereof.

9. A process as defined in claim 2 wherein said (meth-)acrylamide monomer comprises acrylamide; methacrylamide; an N-alkyl acrylamide; an N-alkyl methacrylamide or mixtures thereof.

10. A process as defined in claim 2 wherein said (meth)acrylamide polymer comprises a copolymer of acrylamide and a diallyldialkylammonium chloride.

11. A process as defined in claim 1 wherein said effective amount of surfactant of step (a) (iii) is an amount sufficient to produce as diameter ranging of from about 300 to about 2000 Å.

12. A process as defined in claim 2 wherein said effective amount of surfactant of step (a) (iii) is an amount sufficient to produce a diameter ranging from about 300 to about 2000 Å.

13. A process as defined in claim 1 wherein said effective amount of surfactant in step (a) (iii) is an amount sufficient to produce diameters ranging from about 350 to 1000 Å.

14. A process as defined in claim 2 wherein said effective amount of surfactant in step (a) (iii) is an amount sufficient to produce diameters ranging from about 350 to 1000 Å.

* * * * *